(No Model.) 2 Sheets—Sheet 1.
J. J. BAUSCH.
MACHINE FOR GRINDING SPECTACLE LENSES.
No. 291,130. Patented Jan. 1, 1884.
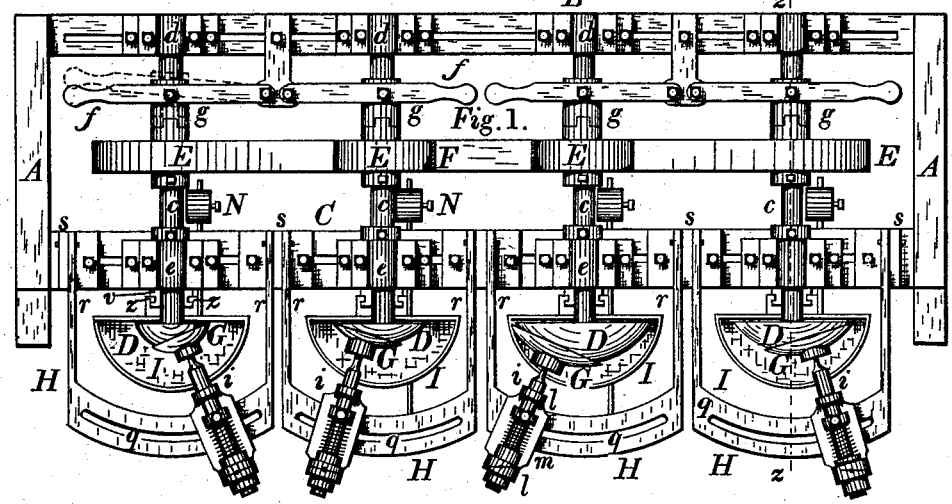
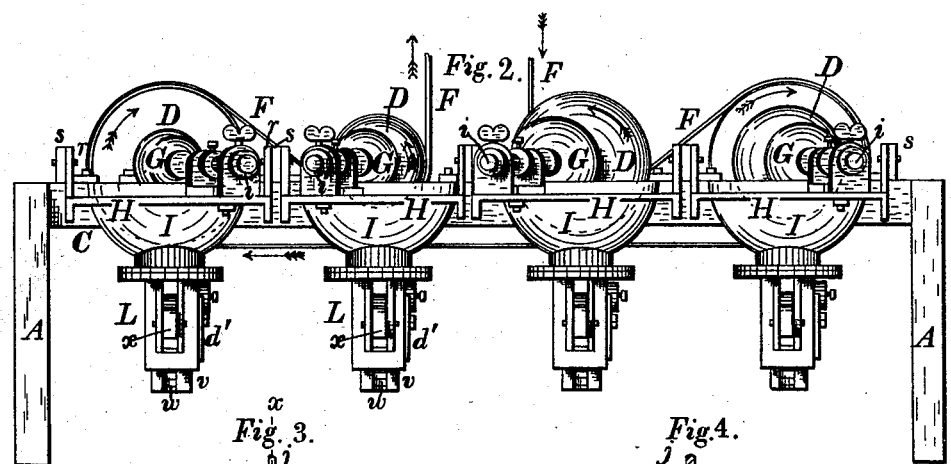
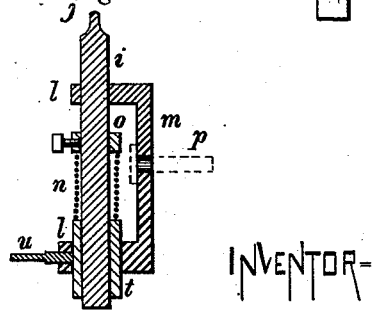
WITNESSES:
H. G. Phillips.
A. R. Selden.
INVENTOR:
John J. Bausch,
by Geo. B. Selden,
Atty.
N. PETERS, Photo-Lithographer, Washington, D. C.

(No Model.) 2 Sheets—Sheet 2.
J. J. BAUSCH.
MACHINE FOR GRINDING SPECTACLE LENSES.
No. 291,130. Patented Jan. 1, 1884.
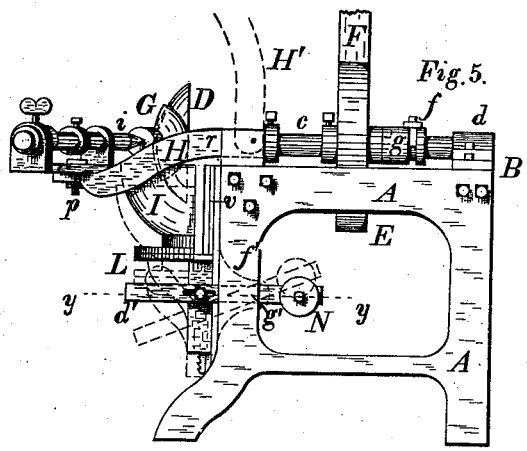
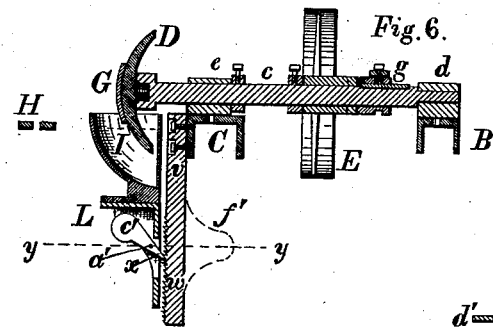
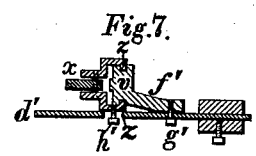
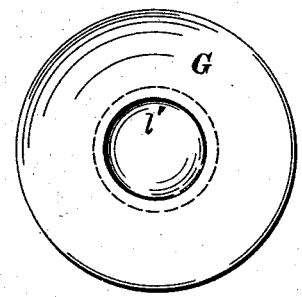
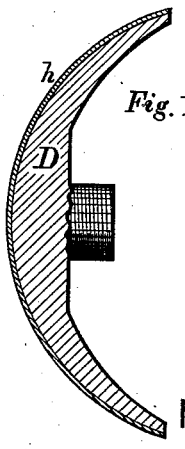
WITNESSES=
A. R. Selden
H. G. Phillips.
INVENTOR=
John J. Bausch,
by Geo. B. Selden,
Atty.

United States Patent Office.

JOHN J. BAUSCH, OF ROCHESTER, NEW YORK.

MACHINE FOR GRINDING SPECTACLE-LENSES.

SPECIFICATION forming part of Letters Patent No. 291,130, dated January 1, 1884.

Application filed June 4, 1883. (No model.)

*To all whom it may concern:*

Be it known that I, JOHN J. BAUSCH, of Rochester, New York, have invented an Improved Machine for Grinding Lenses for Spectacles or other Optical Purposes, of which the following is a specification, reference being had to the accompanying drawings.

My invention relates to certain improvements in machinery for grinding lenses for spectacles and other optical purposes, which improvements are fully described and specified in the following specification.

In the accompanying drawings, representing my improvements, Figure 1 is a plan view. Fig. 2 is a front elevation. Fig. 3 is a plan view of the rod and bearing which supports the grinder. Fig. 4 is a section of the same on the line $x\,x$, Fig. 3. Fig. 5 is a side elevation. Fig. 6 is a vertical section on the line $z\,z$, Fig. 1. Fig. 7 is a section on the line $y\,y$, Figs. 5 and 6. Fig. 8 is an elevation of a grinder. Fig. 9 is a section of the same. Fig. 10 is a section of the convex holder to which the lenses are affixed. Fig. 11 is a sectional view of a convex grinder.

My improved machine for grinding lenses for spectacles or other purposes consists of a suitable framing, A A B C, arranged to support one or more rotating spindles, $c\,c\,c$, each of which carries a holder, D, to which the glasses are attached. The spindle or spindles $c\,c\,c$ are arranged to rotate in suitable bearings, $d\,e$, on the bars B C, which are secured to the side frames, A A. Where more than one spindle is used I arrange them so that they can be driven from a single belt, F, passing under or over the pulleys E, which run loose on the spindles, being provided with clutches $g\,g$, by which any one or more of the pulleys may be disconnected from its spindle, for the purpose of stopping the motion of any one or more of the holders without throwing the others out of operation. The clutches are splined on their respective spindles, being provided with suitable jaws, which engage with corresponding jaws on the hubs of the pulleys, and with levers $f\,f$, by which they are shifted in and out of gear. The bearings $d\,d$ $e\,e$ are attached to the bars B C by bolts passing through slots which permit the lateral adjustment of the bearings, so as to adapt the machine to the use of holders of different sizes. The direction of the motion of the belt F and the rotary holders D is represented by the arrows in Fig. 2, in the case of a four-spindle machine. The holders D are spherical, of any desired size or radius, and preferably, for convenience of removal, attached to the spindles $c$ by screw-threads running in a direction opposite to that in which the spindles revolve. The glasses to be ground on the machine are cemented to the spherical surface of the holder in any preferred manner, as represented at $h$ in the sectional view, Fig. 10.

The grinders G consist of concave plates, of a size and form adapted to work with the holders in connection with which they are to be used, made of cast-iron or other suitable material, and supported against the holders by the rods $i\,i$. Each of the grinders is provided on the side opposite the grinding-surface with the recess $k$, Fig. 9, into which the point $j$ of the rod $i$ fits. The rod $i$ is arranged to slide lengthwise in the bearings $l\,l$, Figs. 3 and 4, on the supporting-plate $m$, being provided with a spring, $n$, by which the rod and grinder are forced toward the revolving holder. The tension of the spring $n$ is adjusted by means of a collar, $o$, on the rod, provided with a set-screw or other means of varying its position thereon. Further provision is made for adjusting the tension of the spring $n$, as large or small holders are employed, by means of the sleeve $t$, Figs. 3 and 4, which is arranged to slide through the outer bearing, $l$, on the supporting-plate $m$, being provided with a set-screw, $u$, by which it may be fastened in any desired position thereon. The plate $m$ is carried by the swinging supporting-frame H, being adjustably attached thereto by the screw or bolt $p$, passing through a curved slot, $q$, in the frame, which permits the arrangement of the rod $i$ and the grinder at any desired angle with the axis of revolution of the holder on either side thereof. The supporting-frame H is provided with arms $r\,r$, which are pivoted at their inner ends to the lugs $s\,s$ on the bar C, so that the supporting-frame carrying the grinder may be swung upward, as represented by the dotted lines H' in Fig. 5, for the purpose of affording access to the revolving holder. The lugs $s\,s$ may be attached to the bar C by bolts passing through the slot therein, by which arrangement the frame and grinder may be adjusted laterally with reference to the holders. The arms $r$ $r$ may be curved downward, as shown in Fig. 5, so as to bring the axis of the rod $i$ in the same horizontal plane with the axis of the spindle $c$. Each of the grinders is supported by the same arrangement of devices in a machine where more than one spindle is employed.

Below the holder and grinder is placed a tank or vessel, I, for holding the grinding material and supplying it continuously to the surfaces to be abraded. The lower part of the holder dips into the tank I, as represented by the dotted lines in Fig. 2, and runs in the grinding material, which may consist of any suitable abrading substance reduced to the degree of fineness required by the work in hand, and rendered fluid or semi-fluid by being mixed with any suitable liquid. The tank I is supported from the cross-bar C of the frame-work of the machine, or from the floor, by the post or standard $v$, Figs. 5 and 6, provision being made for adjusting the tank thereon by means of the rack $w$ and ratchet-catch or pawl $x$, Fig. 6. The post $v$ is provided with grooves, into which suitable projecting lugs, $z z$, Figs. 1 and 7, attached to the sliding bracket L, are fitted; or the bracket which supports the tank I is otherwise adjustably connected with the post $v$. The catch or dog $x$ is pivoted to the bracket L at $a'$, Fig. 6, and it is provided with a spring or counter-weight, $c'$, by which it is held in engagement with the teeth of the rack $w$. The dog thus serves to hold the tank in any desired position relatively to the holder and grinder. The weight of the tank filled with abrading material, and of the bracket L, is preferably partially or nearly balanced by the counter-weight N on the lever $d'$, which is pivoted to an arm, $f'$, on the post $v$ at $g'$, and connected to the bracket L by the stud or pin $h'$, passing through a slot in the lever. The lever $d'$ extends outward, and serves as a handle by which the tank may be lifted.

The tank I may be made of any suitable form adapted to the purpose of sustaining a supply of the abrading material in contact with the lower part of the holder. The tank I and the bracket L may be formed in one piece, instead of being attached together, as represented in the drawings. Each holder and grinder is provided with a tank and mechanism for raising and lowering the same.

In Figs. 8 and 9 I have represented the form of grinder which I prefer to employ, a portion of the grinding-surface being cut away, so as to form the recess $l'$, which prevents any grinding action on the glasses on the holder, except by the annular curved surface of the grinder outside of the central recess.

The grinders G may be made convex instead of concave, as represented in Fig. 11, being provided with the central recess, as before described. When the grinders are convex they are to be used, in connection with concave holders, for the purpose of grinding concave lenses, the axis of the grinders being placed at an angle with the axis of the revolution of the holders. In either case the placing of the axis of the grinder at an angle with that of the holder serves to communicate a rotary movement to the grinder at a different rate of speed from that of the holder, thereby securing uniformity in the grinding operation.

I claim—

1. The combination, with the glass-holder D and grinder G, of the tank I, arranged to supply abrading material to the grinding-surfaces, substantially as and for the purposes set forth.

2. The combination, with the glass-holder D and grinder G, of the adjustable tank I, and mechanism for varying its position relatively to the holder, substantially as and for the purposes set forth.

3. The combination, with a suitable supporting-frame, of the glass-holder D, grinder G, tank I, rack $w$, and dog $x$, substantially as and for the purposes set forth.

4. The combination, with the rotating glass-holder D, of the revolving friction-driven grinder G, provided with central recess, $l'$, substantially as described.

5. The combination, with a suitable supporting-frame, of the revolving glass-holder D, grinder G, and swinging frame H, substantially as described.

6. The combination, with the glass-holder D and grinder G, of the spindle $i$, collar $o$, spring $n$, and adjustable sleeve $t$, substantially as described.

7. The combination, with the revolving glass-holder D and grinder G, of the spindle $i$, and suitable mechanism for adjusting and supporting the spindle at any desired angle with the axis of rotation of the holder, substantially as described.

8. The combination, with the revolving glass-holder D and grinder G, of the spindle $i$, plate $m$, having bearings $l\ l$ for the spindle, and supporting-frame H, provided with slot $q$, and bolt and nut $p$, substantially as described.

JOHN J. BAUSCH.

Witnesses:
GEO. B. SELDEN,
H. G. PHILLIPS.